(12) United States Patent
Torita et al.

(10) Patent No.: US 10,249,878 B2
(45) Date of Patent: Apr. 2, 2019

(54) NON-AQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Koji Torita, Nagoya (JP); Hideaki Fujita, Kyotanabe (JP); Kaoru Inoue, Hirakata (JP); Tatsuya Hashimoto, Osaka (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 16 days.

(21) Appl. No.: 15/685,037

(22) Filed: Aug. 24, 2017

(65) Prior Publication Data

US 2018/0090763 A1 Mar. 29, 2018

(30) Foreign Application Priority Data

Sep. 26, 2016 (JP) .................................. 2016-187266

(51) Int. Cl.
*H01M 4/62* (2006.01)
*H01M 2/02* (2006.01)
*H01M 10/0525* (2010.01)
*H01M 2/16* (2006.01)
*H01M 10/058* (2010.01)

(52) U.S. Cl.
CPC ........... *H01M 4/62* (2013.01); *H01M 2/0237* (2013.01); *H01M 2/1673* (2013.01); *H01M 10/058* (2013.01); *H01M 10/0525* (2013.01); *H01M 2220/20* (2013.01)

(58) Field of Classification Search
CPC ........ H01M 4/62; H01M 2/02; H01M 2/0237; H01M 10/0525
See application file for complete search history.

(56) References Cited

FOREIGN PATENT DOCUMENTS

| JP | 2000-285966 A | 10/2000 |
|----|---------------|---------|
| JP | 2014-137985 A | 7/2014  |
| JP | 2014-154447 A | 8/2014  |
| JP | 2014-199782 A | 10/2014 |

*Primary Examiner* — Karie O'Neill Apicella
(74) *Attorney, Agent, or Firm* — Sughrue Mion, PLLC

(57) ABSTRACT

A positive electrode and a negative electrode are stacked so as to face each other with a separator and a low spring constant film interposed therebetween. The positive electrode or the negative electrode has a first spring constant that is the lowest spring constant of the positive electrode, the negative electrode and the separator. The low spring constant film has a second spring constant. The second spring constant is lower than the first spring constant.

6 Claims, 8 Drawing Sheets

NON-AQUEOUS ELECTROLYTE SECONDARY BATTERY

This nonprovisional application is based on Japanese Patent Application No. 2016-187266 filed on Sep. 26, 2016, with the Japan Patent Office, the entire contents of which are hereby incorporated by reference.

BACKGROUND

Field

The present disclosure relates to a non-aqueous electrolyte secondary battery.

Description of the Background Art

Japanese Patent Laying-Open No. 2000-285966 discloses a non-aqueous electrolyte secondary battery configured such that the compressive modulus of elasticity of a negative electrode is higher than the compressive modulus of elasticity of at least one of a positive electrode and a separator.

SUMMARY

In a non-aqueous electrolyte secondary battery (hereinafter also simply referred to as a "battery"), a non-aqueous electrolyte solution includes an aprotic solvent and a supporting electrolyte salt. In the aprotic solvent, the supporting electrolyte salt is dissociated into cations (typically, lithium ions) acting as charge carriers, and counter anions. A positive electrode, a negative electrode and a separator form an electrode group. Each of the positive electrode, the negative electrode and the separator at least partially includes a porous structure. The positive electrode and the negative electrode are stacked so as to face each other with the separator interposed therebetween. The positive electrode, the negative electrode and the separator are impregnated with the non-aqueous electrolyte solution.

The positive electrode and the negative electrode expand and contract with charging/discharging of the battery. The expansion/contraction of the positive electrode and the negative electrode causes the non-aqueous electrolyte solution with which the positive electrode and the negative electrode have been impregnated to be pushed out of the positive electrode and the negative electrode. The non-aqueous electrolyte solution pushed out of the positive electrode and the negative electrode flows out of the electrode group.

According to Japanese Patent Laying-Open No. 2000-285966, cycling characteristics are improved since the compressive modulus of elasticity of the negative electrode is higher than the compressive moduli of elasticity of the positive electrode and the separator. This is presumably because the expansion/contraction of the negative electrode is absorbed by the positive electrode and the separator, whereby the pushing of the non-aqueous electrolyte solution out of the negative electrode is suppressed. It is believed, however, that the pushing of the non-aqueous electrolyte solution out of the positive electrode cannot be suppressed in the configuration of Japanese Patent Laying-Open No. 2000-285966.

According to new findings of the present disclosure, the pushing of the non-aqueous electrolyte solution out of the positive electrode or the negative electrode causes variation in the concentration of the supporting electrolyte salt (hereinafter also referred to as "salt concentration") in the non-aqueous electrolyte solution in a width direction of the electrode group. This tendency is particularly noticeable during high-rate cycling when high-rate charging is repeated.

During charging, cations are released from the positive electrode into the non-aqueous electrolyte solution with which the positive electrode has been impregnated. Cations in the non-aqueous electrolyte solution with which the negative electrode has been impregnated are absorbed by the negative electrode. The cations in the non-aqueous electrolyte solution move in such a manner as to cancel out the cation concentration gradient (namely, salt concentration gradient) that has occurred between the positive electrode and the negative electrode. During high-rate charging, however, the movement of the cations in the non-aqueous electrolyte solution is slower than the absorption and release of the cations at the electrodes. Accordingly, the salt concentration is increased in the non-aqueous electrolyte solution with which the positive electrode has been impregnated, and the salt concentration is reduced in the non-aqueous electrolyte solution with which the negative electrode has been impregnated.

When the non-aqueous electrolyte solution is pushed out of the positive electrode or the negative electrode in this state, the non-aqueous electrolyte solution having a high salt concentration or the non-aqueous electrolyte solution having a low salt concentration flows out of the electrode group. This presumably causes the variation in the salt concentration in the width direction of the electrode group. The variation in the salt concentration presumably causes electrode reaction to be not uniform, resulting in increased resistance.

Thus, an object of the present disclosure is to provide a non-aqueous electrolyte secondary battery excellent in high-rate cycling characteristics.

Hereinafter, the technical configuration as well as the function and effect of the present disclosure will be described. However, the mechanism of the function of the present disclosure includes presumption. The scope of claims should not be limited by whether the mechanism of the function is correct or incorrect.

[1] A non-aqueous electrolyte secondary battery of the present disclosure includes a case, a non-aqueous electrolyte solution and an electrode group. The non-aqueous electrolyte solution and the electrode group are housed in the case. The non-aqueous electrolyte solution includes an aprotic solvent and a supporting electrolyte salt. The electrode group includes a positive electrode, a negative electrode, a separator and a low spring constant film. Each of the positive electrode, the negative electrode, the separator and the low spring constant film at least partially includes a porous structure. The positive electrode, the negative electrode, the separator and the low spring constant film are impregnated with the non-aqueous electrolyte solution. In the electrode group, the positive electrode and the negative electrode are stacked so as to face each other with the separator and the low spring constant film interposed therebetween. The positive electrode or the negative electrode has a first spring constant that is the lowest spring constant of the positive electrode, the negative electrode and the separator. The low spring constant film has a second spring constant. The second spring constant is lower than the first spring constant.

The "spring constant" is an index indicating the hardness of an object. It may be considered that the hardness of an object increases as the spring constant increases. A method of measuring the spring constant will be described later.

The pushing of the non-aqueous electrolyte solution associated with charging/discharging of the battery is likely to occur initially from the softest one of components of the electrode group. This is because the softest component is preferentially crushed when pressure occurs in a direction in which the positive electrode and the negative electrode are stacked due to the charging/discharging of the battery. Being the softest means having the lowest spring constant.

By way of example, a situation where the negative electrode is the softest will be described. The negative electrode expands due to high-rate charging. However, since the positive electrode and the separator are harder than the negative electrode, the negative electrode cannot push away the positive electrode and the separator. As a result, the expansion of the negative electrode moves in a direction that crushes voids in the negative electrode. This presumably causes the non-aqueous electrolyte solution held in the voids in the negative electrode to be pushed out.

FIG. 1 is a first conceptual diagram showing an electrode group according to a reference embodiment. FIG. 1 shows a state before high-rate charging. An electrode group 203 includes a positive electrode 10, a negative electrode 20 and a separator 30. Positive electrode 10 and negative electrode 20 are stacked so as to face each other with separator 30 interposed therebetween. In the state before charging, the salt concentration in a non-aqueous electrolyte solution in positive electrode 10, negative electrode 20 and separator 30 is uniform. The non-aqueous electrolyte solution is not shown in FIGS. 1 to 4.

FIG. 2 is a second conceptual diagram showing the electrode group according to the reference embodiment. FIG. 2 shows a state during high-rate charging. During the high-rate charging, the salt concentration in the non-aqueous electrolyte solution in positive electrode 10 is increased, and the salt concentration in the non-aqueous electrolyte solution in negative electrode 20 is reduced. The non-aqueous electrolyte solution in separator 30 has a salt concentration intermediate between the salt concentration in the non-aqueous electrolyte solution in positive electrode 10 and the salt concentration in the non-aqueous electrolyte solution in negative electrode 20. When negative electrode 20 is the softest of positive electrode 10, negative electrode 20 and separator 30, the non-aqueous electrolyte solution having a low salt concentration is pushed out of negative electrode 20. The non-aqueous electrolyte solution pushed out of negative electrode 20 flows out of electrode group 203.

FIG. 5 is a schematic cross-sectional view showing an example of the configuration of a non-aqueous electrolyte secondary battery. Electrode group 203 and a non-aqueous electrolyte solution 102 are housed in a case 101. Electrode group 203 is impregnated with non-aqueous electrolyte solution 102. That is, non-aqueous electrolyte solution 102 is held within electrode group 203. There is an excess of non-aqueous electrolyte solution 102 in case 101. The "excess of non-aqueous electrolyte solution" indicates the non-aqueous electrolyte solution present outside electrode group 203. Non-aqueous electrolyte solution 102 enters and exits electrode group 203 at the ends in a width direction of electrode group 203 (X-axis direction in FIG. 5).

When non-aqueous electrolyte solution 102 having a low salt concentration flows out of electrode group 203 as described above, the salt concentration in the excess of non-aqueous electrolyte solution 102 present outside electrode group 203 is reduced.

During discharging, electrode group 203 relaxes, causing the excess of non-aqueous electrolyte solution 102 to flow into electrode group 203. However, it is difficult for non-aqueous electrolyte solution 102 to completely return to a central portion of electrode group 203. As a result, non-aqueous electrolyte solution 102 having a low salt concentration remains at the ends in the width direction of electrode group 203. This presumably causes a state in which the salt concentration is high at the central portion of electrode group 203 and the salt concentration is low at the ends of electrode group 203 (namely, variation in the salt concentration) in the width direction of electrode group 203. The variation in the salt concentration presumably causes electrode reaction to be not uniform.

When positive electrode 10 is the softest, non-aqueous electrolyte solution 102 having a high salt concentration is pushed out of positive electrode 10. This presumably causes a state in which the salt concentration is low at the central portion of electrode group 203 and the salt concentration is high at the ends of electrode group 203 in the width direction of electrode group 203. Such variation in the salt concentration also presumably causes electrode reaction to be not uniform.

FIG. 3 is a first conceptual diagram showing an electrode group according to the present disclosure. FIG. 3 shows a state before high-rate charging. An electrode group 103 includes positive electrode 10, negative electrode 20, separator 30 and a low spring constant film 40. Positive electrode 10 and negative electrode 20 are stacked so as to face each other with separator 30 and low spring constant film 40 interposed therebetween. In the state before charging, the salt concentration in the non-aqueous electrolyte solution in positive electrode 10, negative electrode 20, separator 30 and low spring constant film 40 is uniform.

FIG. 4 is a second conceptual diagram showing the electrode group according to the present disclosure. FIG. 4 shows a state during high-rate charging. During the high-rate charging, the salt concentration in the non-aqueous electrolyte solution in positive electrode 10 is increased, and the salt concentration in the non-aqueous electrolyte solution in negative electrode 20 is reduced. The non-aqueous electrolyte solution in separator 30 and low spring constant film 40 has a salt concentration intermediate between the salt concentration in the non-aqueous electrolyte solution in positive electrode 10 and the salt concentration in the non-aqueous electrolyte solution in negative electrode 20.

Low spring constant film 40 is the softest component in electrode group 103 according to the present disclosure. That is, positive electrode 10 or negative electrode 20 has a first spring constant that is the lowest spring constant of positive electrode 10, negative electrode 20 and separator 30, and low spring constant film 40 has a second spring constant lower than the first spring constant.

Thus, the non-aqueous electrolyte solution is preferentially pushed out of low spring constant film 40. The non-aqueous electrolyte solution in low spring constant film 40 has an intermediate salt concentration (average salt concentration) in electrode group 103. Accordingly, even when this non-aqueous electrolyte solution flows out of electrode group 103, the salt concentration in the excess of non-aqueous electrolyte solution 102 presumably does not vary significantly. Therefore, even when the excess of non-aqueous electrolyte solution 102 flows into electrode group 103, variation in the salt concentration is presumably less likely to occur in a width direction of electrode group 103. That is, variation in the salt concentration is presumably suppressed in the non-aqueous electrolyte secondary battery of the present disclosure. The non-aqueous electrolyte secondary battery of the present disclosure is thus considered to be excellent in high-rate cycling characteristics.

[2] A ratio of the second spring constant to the first spring constant is preferably not less than 0.60 and not more than 0.90. The high-rate cycling characteristics are thus expected to be improved.

[3] The low spring constant film is preferably disposed on a surface of at least one of the positive electrode and the negative electrode. Since the low spring constant film is disposed adjacent to the positive electrode and the negative electrode, the expansion of the positive electrode and the negative electrode is presumably more likely to be absorbed by the low spring constant film. Accordingly, variation in the salt concentration is presumably further suppressed. That is, the high-rate cycling characteristics are expected to be further improved.

[4] The low spring constant film may include at least one of a porous fluoroelastomer film and a porous styrene-butadiene rubber film, for example. The porous fluoroelastomer film and the porous styrene-butadiene rubber film may have a spring constant suitable for the non-aqueous electrolyte secondary battery of the present disclosure. The porous fluoroelastomer film and the porous styrene-butadiene rubber film are resistant to a non-aqueous electrolyte solution.

[5] The low spring constant film may have a thickness of not less than 2 μm and not more than 5 μm, for example. When the low spring constant film has a thickness of less than 2 μm, the improved effect of the high-rate cycling characteristics may be reduced. The upper limit of the thickness of the low spring constant film should not be particularly limited. However, the volume-capacity density of the battery may be reduced as the thickness of the low spring constant film increases. The upper limit of the thickness of the low spring constant film may be 5 μm, for example.

[6] The non-aqueous electrolyte secondary battery of the present disclosure may be configured such that the case applies compression force to the electrode group in a direction in which the positive electrode and the negative electrode are stacked. In the battery configured such that the case applies compression force to the electrode group, the expansion of the positive electrode and the negative electrode has no place to escape, and therefore, the non-aqueous electrolyte solution is likely to be pushed out of the positive electrode and the negative electrode. By applying the configuration of the present disclosure to such a battery, the high-rate cycling characteristics are expected to be significantly improved.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment of the present disclosure (hereinafter referred to as "the present embodiment") will be described. However, the description below does not limit the scope of claims. In the description below, a lithium ion secondary battery will be described as a non-aqueous electrolyte secondary battery. However, the non-aqueous electrolyte secondary battery of the present embodiment should not be limited to the lithium ion secondary battery.

<Non-Aqueous Electrolyte Secondary Battery>

Figure 5:
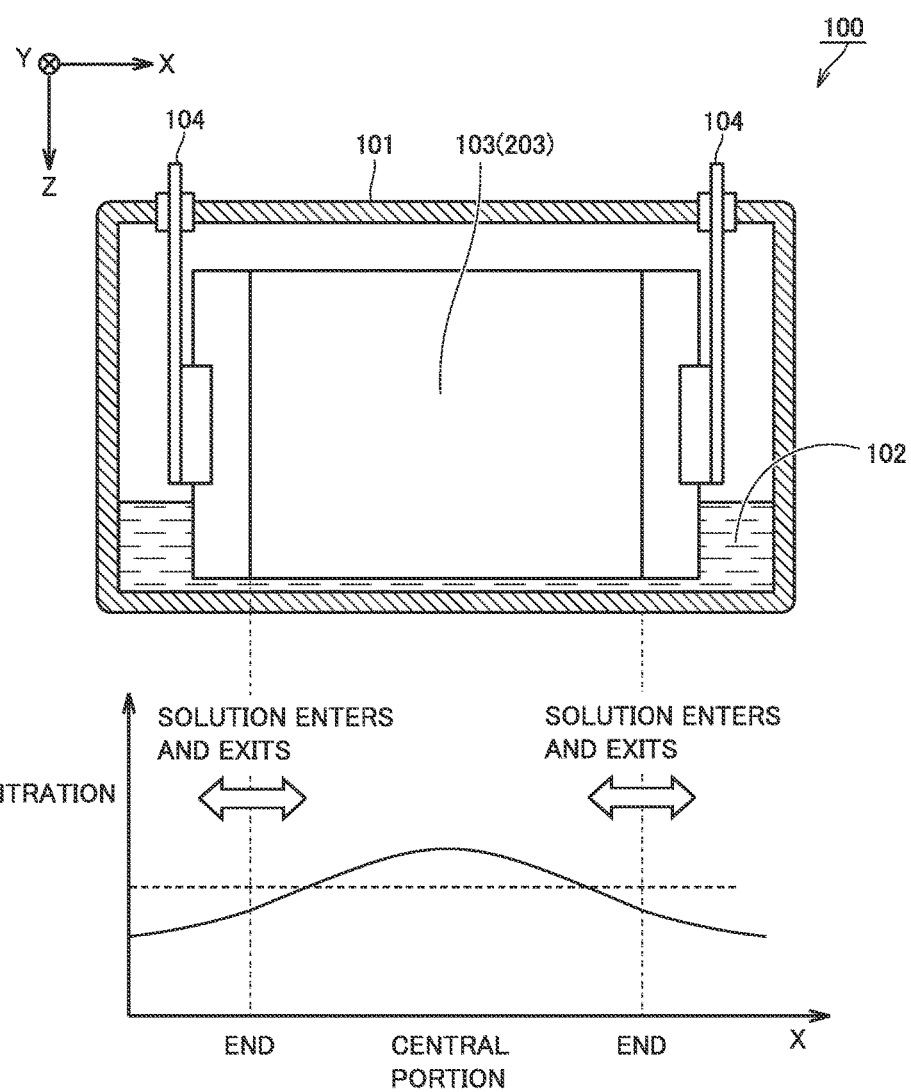
FIG. 5 is a schematic cross-sectional view showing an example of the configuration of a non-aqueous electrolyte secondary battery.

As shown in FIG. 5, a battery 100 includes a case 101, a non-aqueous electrolyte solution 102 and an electrode group 103. Non-aqueous electrolyte solution 102 and electrode group 103 are housed in case 101. Electrode group 103 is guided to the outside of case 101 by a collector terminal 104. Electrode group 103 is impregnated with non-aqueous electrolyte solution 102. An excess of non-aqueous electrolyte solution 102 is stored at the bottom of case 101.

<<Case>>

Case 101 in FIG. 5 has a prismatic shape (flat rectangular parallelepiped). However, the case of the present embodiment may have a cylindrical shape. Typically, a metal material such as aluminum (Al) or an Al alloy forms case 101. However, a pouch made of an aluminum laminate, for example, may form case 101 as long as the case has prescribed sealability. Although not shown in FIG. 5, case 101 may include a liquid inlet, a safety valve, a current interrupt device (CID), and the like.

<<Electrode Group>>

Figure 6:
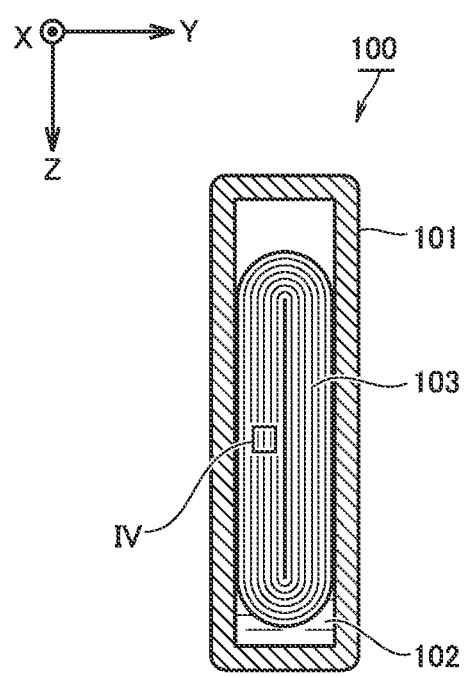
FIG. 6 is a schematic cross-sectional view along the Y-Z plane in FIG. 5.

FIG. 6 is a schematic cross-sectional view along the Y-Z plane in FIG. 5. Electrode group 103 is a wound-type electrode group. Electrode group 103 is constructed by stacking and winding a strip-like positive electrode 10 and a strip-like negative electrode 20 with a strip-like separator 30 and a strip-like low spring constant film 40 interposed therebetween. Electrode group 103 may be a stacked-type electrode group. The stacked-type electrode group is constructed, for example, by alternately stacking a rectangular positive electrode and a rectangular negative electrode with a rectangular separator and a rectangular low spring constant film interposed therebetween.

A Y-axis direction in FIG. 6 corresponds to a direction in which positive electrode 10 and negative electrode 20 are stacked. Electrode group 103 is in contact with case 101 at the ends in the Y direction. That is, battery 100 is configured such that case 101 applies compression force to electrode group 103 in the stacking direction of positive electrode 10 and negative electrode 20.

Electrode group 103 and case 101 may be in direct or indirect contact with each other. The indirect contact refers to a situation where, for example, a packaging material made of resin is present between electrode group 103 and case 101. The packaging material is made of polypropylene, for example. A member for compressing electrode group 103 with case 101 interposed therebetween may be disposed outside case 101. Examples of such a member include a plate having comb-like projections on its surface. The plate may be made of metal or resin.

Since case 101 applies compression force to electrode group 103, the expansion of case 101 is suppressed. On the other hand, however, the expansion of positive electrode 10 and negative electrode 20 has no place to escape, and therefore, voids in positive electrode 10 and negative electrode 20 are likely to be crushed. Thus, non-aqueous electrolyte solution 102 is likely to be pushed out of positive electrode 10 and negative electrode 20. It is presumed that variation in the salt concentration is thereby more likely to occur. In the present embodiment, however, since electrode group 103 includes low spring constant film 40, the variation in the salt concentration can be suppressed.

Figure 1:
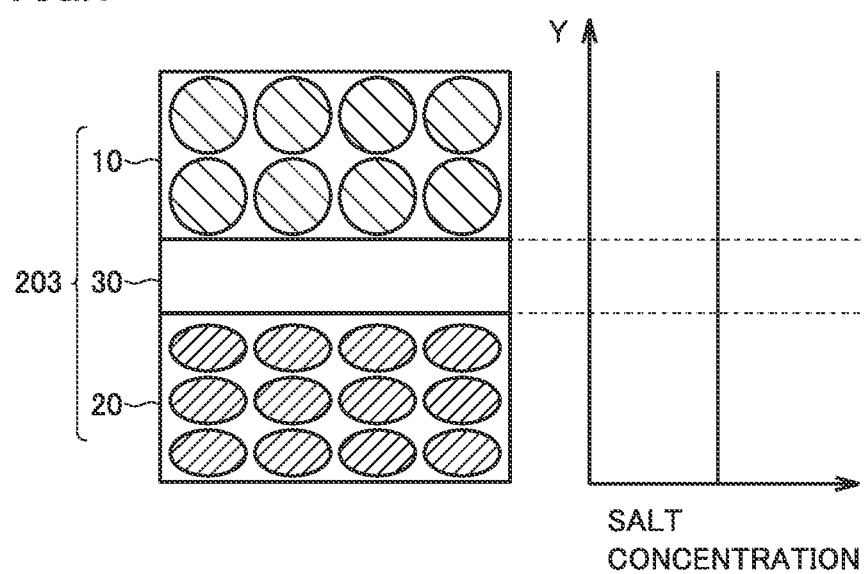
FIG. 1 is a first conceptual diagram showing an electrode group according to a reference embodiment.
Figure 2:
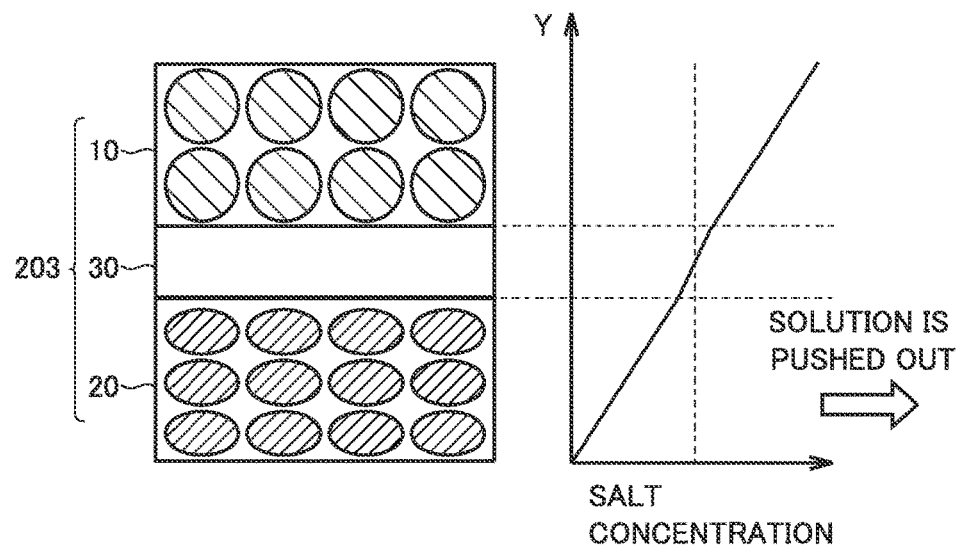
FIG. 2 is a second conceptual diagram showing the electrode group according to the reference embodiment.
Figure 3:
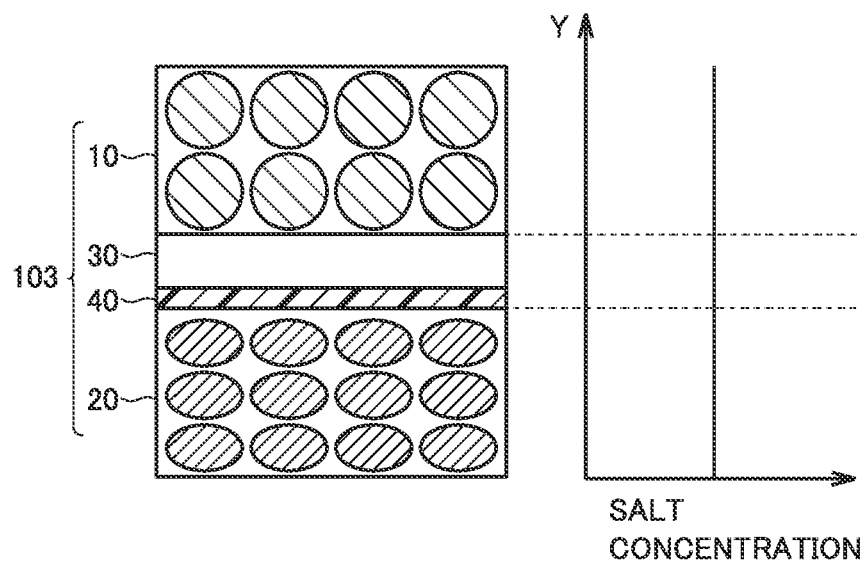
FIG. 3 is a first conceptual diagram showing an electrode group according to the present disclosure.
Figure 4:
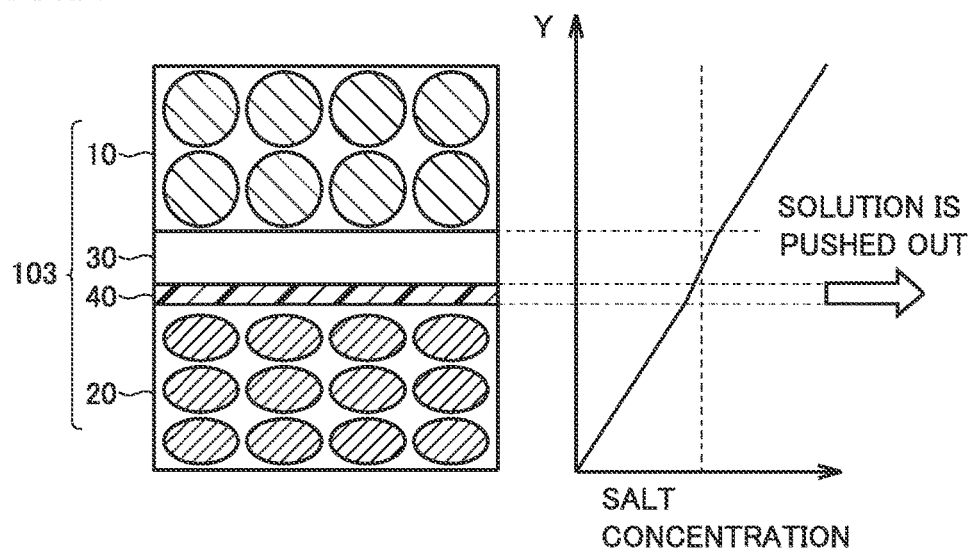
FIG. 4 is a second conceptual diagram showing the electrode group according to the present disclosure.

FIG. 4 conceptually illustrates a region IV in FIG. 6. Electrode group 103 includes positive electrode 10, negative electrode 20, separator 30 and low spring constant film 40. Each of positive electrode 10, negative electrode 20, separator 30 and low spring constant film 40 at least partially includes a porous structure. Positive electrode 10, negative electrode 20, separator 30 and low spring constant film 40 are impregnated with non-aqueous electrolyte solution 102. In electrode group 103, positive electrode 10 and negative electrode 20 are stacked so as to face each other with separator 30 and low spring constant film 40 interposed therebetween.

Positive electrode 10, negative electrode 20 and separator 30 have their own prescribed spring constants. Positive electrode 10 or negative electrode 20 has the lowest spring constant of them. This lowest spring constant is a first spring constant. Low spring constant film 40 has a second spring constant. The second spring constant is lower than the first spring constant. That is, low spring constant film 40 is the softest of the components of electrode group 103. Thus, the expansion of positive electrode 10 and negative electrode 20 is absorbed by low spring constant film 40. Non-aqueous electrolyte solution 102 is thus preferentially pushed out of low spring constant film 40. Non-aqueous electrolyte solution 102 in low spring constant film 40 has an average salt concentration in the stacking direction of positive electrode 10 and negative electrode 20. Since non-aqueous electrolyte solution 102 having the average salt concentration flows out of electrode group 103, the variation in the salt concentration is presumably suppressed in a width direction of electrode group 103 (X-axis direction in FIG. 5).

(Spring Constant)

The "first spring constant" and the "second spring constant" in the present specification are measured with the following method. A square sample is cut from positive electrode 10, negative electrode 20 or separator 30. The sample size is determined according to the shape of each member. When each member is a strip-like sheet (when each member is a member for a wound-type electrode group), the length of a side of the square is half the width of each member. The width as used herein refers to a dimension in a direction orthogonal to the longitudinal direction. When the member has a width of 100 mm, for example, the length of a side of the square is 50 mm. That is, the sample size is 50 mm×50 mm. The sample cut from positive electrode 10 or negative electrode 20 includes a positive electrode composite material layer 12 or a negative electrode composite material layer 22 which will be described later on its entire surface.

When each member is a rectangular sheet (when each member is a member for a stacked-type electrode group), the length of a side of the square is half the short side of each member. The short side refers to a shorter side of the rectangle. When each member is a square, each side is regarded as the short side. When each member is 80 mm×60 mm, for example, the length of a side of the square is 30 mm. That is, the sample size is 30 mm×30 mm.

It is noted that a square in the present application does not only refer to a geometrically perfect square. In the present specification, a quadrangle is regarded as a square when the length of each side of the quadrangle is not less than 97% and not more than 103% of an average value of the lengths of four sides.

Fifty samples are prepared for each member. The 50 samples are stacked. The stacked 50 samples are sandwiched between two stainless steel (SUS) plates. A compression tester is prepared. As the compression tester, the "Autograph precision universal tester" manufactured by Shimadzu Corporation or its equivalent is used, for example. The 50 samples are placed together with the SUS plates on a sample stage of the compression tester.

A load is applied in a direction in which the samples are stacked (thickness direction). A displacement in the thickness direction (stacking direction) relative to the load is measured. The displacement (unit: mm) relative to the load (unit: kN) is plotted on two-dimensional coordinates representing the load on the vertical axis and the displacement on the horizontal axis. A spring constant (unit: kN/mm) is calculated as an inclination of the drawn straight line.

In this manner, the spring constant of positive electrode 10, the spring constant of negative electrode 20 and the spring constant of separator 30 are measured. The lowest value of the spring constant of positive electrode 10, the spring constant of negative electrode 20 and the spring constant of separator 30 is the "first spring constant." The first spring constant of the present embodiment is the spring constant of positive electrode 10 or negative electrode 20.

The "second spring constant" is the spring constant of low spring constant film 40. The second spring constant may be measured in the same procedure as that for the spring constant of positive electrode 10, negative electrode 20 or separator 30. When low spring constant film 40 is formed on the surface of positive electrode 10 or negative electrode 20, the second spring constant is measured as follows.

A square sample is cut from positive electrode 10 or negative electrode 20 having low spring constant film 40 on its surface. Fifty samples are prepared. The spring constant is measured in the same procedure as above. Measurement results are plotted on two-dimensional coordinates representing the load on the vertical axis and the displacement on the horizontal axis. The straight line is corrected by subtracting the separately measured displacement of positive electrode 10 or negative electrode 20 from the displacement. The second spring constant is calculated as an inclination of the corrected straight line.

The first spring constant and the second spring constant should not be particularly limited as long as the relation of "first spring constant>second spring constant" is satisfied. The first spring constant may be not less than 90 kN/mm and not more than 150 kN/mm, or not less than 90 kN/mm and not more than 105 kN/mm, for example. The second spring constant may be not less than 54 kN/mm and not more than 81 kN/mm, not less than 54 kN/mm and not more than 70 kN/mm, not less than 54 kN/mm and not more than 65 kN/mm, or not less than 54 kN/mm and not more than 63 kN/mm, for example.

A ratio of the second spring constant to the first spring constant (hereinafter also referred to as a "spring constant ratio") is calculated by dividing the second spring constant by the first spring constant. In the division, the ratio is rounded off to the second decimal place. The spring constant ratio is preferably not less than 0.60 and not more than 0.90. The high-rate cycling characteristics are thus expected to be improved. The spring constant ratio is more preferably not less than 0.60 and not more than 0.78, and further more preferably not less than 0.60 and not more than 0.70.

Hereinafter, each member forming electrode group 103 will be described.

<<Positive Electrode>>

Figure 7:
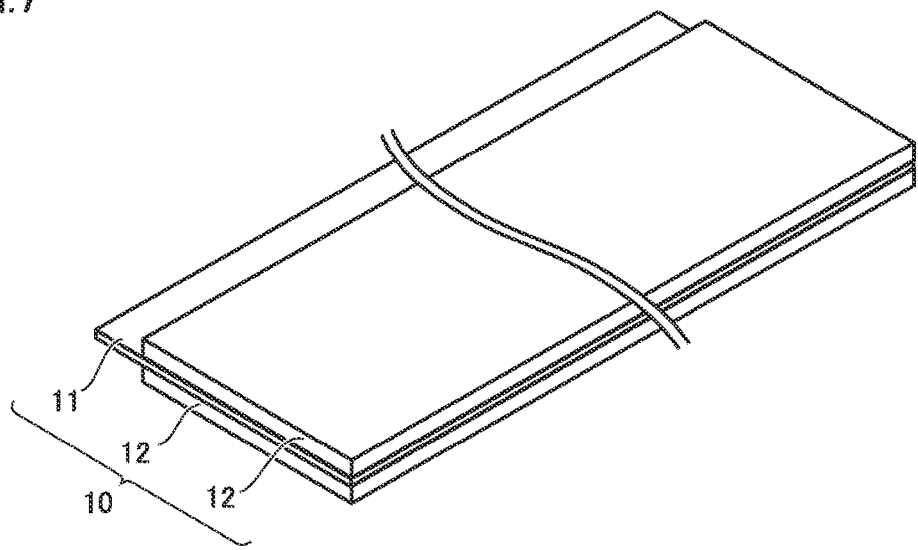
FIG. 7 is a schematic diagram showing an example of the configuration of a positive electrode.

FIG. 7 is a schematic diagram showing an example of the configuration of a positive electrode. Positive electrode 10 is a positive electrode for a wound-type electrode group. Positive electrode 10 is a strip-like sheet. Positive electrode 10 includes a positive electrode collector foil 11 and positive electrode composite material layer 12. Positive electrode collector foil 11 may be an Al foil, for example. The Al foil may be a pure Al foil, or an Al alloy foil. Positive electrode collector foil 11 may have a thickness of about 5 to 30 μm, for example. Positive electrode composite material layer 12 is disposed on the surfaces of positive electrode collector foil 11. Positive electrode composite material layer 12 is disposed on both surfaces of positive electrode collector foil 11. Positive electrode composite material layer 12 may have a thickness of about 10 to 150 μm, for example.

Positive electrode collector foil 11 is exposed at an end in a width direction of positive electrode 10 (direction orthogonal to the longitudinal direction). Exposed positive electrode collector foil 11 is connected to collector terminal 104.

Positive electrode composite material layer 12 includes a positive electrode active material. The positive electrode active material is particles that can absorb and release lithium ions. The positive electrode active material may have an average particle size of about 1 to 20 μm (typically, 1 to 10 μm), for example. It is assumed that the average particle size in the present specification represents the size of particles at an integrated value of 50% from the finest particle in volume-based particle size distribution measured by a laser diffraction scattering method. In positive electrode composite material layer 12, gaps between the particles (positive electrode active material) are not completely closed. Positive electrode composite material layer 12 is thus porous. That is, positive electrode 10 at least partially includes a porous structure. However, the porous structure as used herein may be a structure impregnated with non-aqueous electrolyte solution 102, and may be any structure as long as it is impregnated with non-aqueous electrolyte solution 102.

Positive electrode composite material layer 12 includes 80 to 98 mass % of a positive electrode active material, 1 to 15 mass % of a conductive material, and 1 to 5 mass % of a binder, for example. The positive electrode active material may be $LiCoO_2$, $LiNiO_2$, $LiMnO_2$, $LiMn_2O_4$, $LiNi_aCo_bMn_cO_2$ (where $0<a<1$, $0<b<1$, $0<c<1$, and $a+b+c=1$), or $LiFePO_4$, for example. Examples of the positive electrode active material expressed by $LiNi_aCo_bMn_cO_2$ include $LiNi_{1/3}Co_{1/3}Mn_{1/3}O_2$. The positive electrode active material may be used alone or in combination of two or more.

The conductive material should not be particularly limited. Examples of the conductive material include: carbon black such as acetylene black (AB), thermal black, or furnace black; and vapor grown carbon fiber (VGCF). The conductive material may be used alone or in combination of two or more. The binder should not be particularly limited, either. Examples of the binder include polyvinylidene fluoride (PVdF), polytetrafluoroethylene (PTFE), and polyacrylic acid (PAA). The binder may also be used alone or in combination of two or more.

Positive electrode 10 may have a spring constant of about 90 to 150 kN/mm (typically, higher than 107 kN/mm and not more than 150 kN/mm), for example. The spring constant of positive electrode 10 may be adjusted by the material of positive electrode collector foil 11, the thickness of positive electrode collector foil 11, the composition of positive electrode composite material layer 12, the density of positive electrode composite material layer 12, and the thickness of positive electrode composite material layer 12, for example. Positive electrode composite material layer 12 may have a density of about not less than 1.5 g/cm³ and not more than 4.0 g/cm³ (typically, not less than 2.0 g/cm³ and not more than 3.0 g/cm³), for example.

<<Negative Electrode>>

Figure 8:
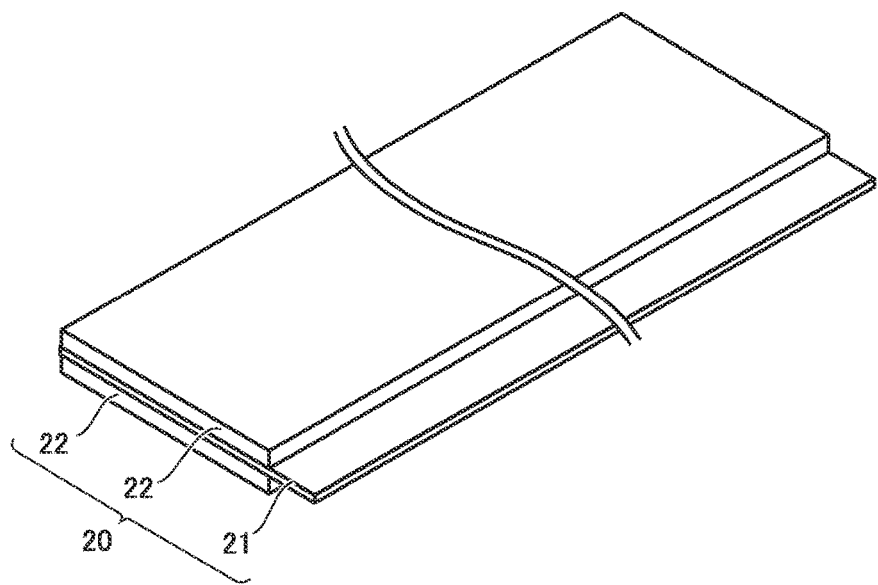
FIG. 8 is a schematic diagram showing an example of the configuration of a negative electrode.

FIG. 8 is a schematic diagram showing an example of the configuration of a negative electrode. Negative electrode 20 is a negative electrode for a wound-type electrode group. Negative electrode 20 is a strip-like sheet. Negative electrode 20 includes a negative electrode collector foil 21 and negative electrode composite material layer 22. Negative electrode collector foil 21 may be a copper (Cu) foil, for example. The Cu foil may be a pure Cu foil, or a Cu alloy foil. Negative electrode collector foil 21 may have a thickness of about 5 to 30 μm, for example. Negative electrode composite material layer 22 is disposed on the surfaces of negative electrode collector foil 21. Negative electrode composite material layer 22 is disposed on both surfaces of negative electrode collector foil 21. Negative electrode composite material layer 22 may have a thickness of about 10 to 150 μm, for example.

Negative electrode collector foil 21 is exposed at an end in a width direction of negative electrode 20. Exposed negative electrode collector foil 21 is connected to collector terminal 104.

Negative electrode composite material layer 22 includes a negative electrode active material. The negative electrode active material is particles that can absorb and release lithium ions. The negative electrode active material may have an average particle size of about 1 to 20 μm (typically, 5 to 15 μm), for example. In negative electrode composite material layer 22, gaps between the particles (negative electrode active material) are not completely closed. Negative electrode composite material layer 22 is thus porous. That is, negative electrode 20 at least partially includes a porous structure. However, the porous structure as used herein may be a structure impregnated with non-aqueous electrolyte solution 102, and may be any structure as long as it is impregnated with non-aqueous electrolyte solution 102.

Negative electrode composite material layer 22 includes 90 to 99 mass % of a negative electrode active material, 0 to 5 mass % of a conductive material, and 1 to 5 mass % of a binder, for example. The negative electrode active material may be graphite, soft carbon, hard carbon, silicon, silicon oxide, tin, or tin oxide, for example. The negative electrode active material may be used alone or in combination of two or more.

The conductive material should not be particularly limited. Examples of the conductive material include: carbon black such as AB, thermal black, or furnace black; and VGCF. The conductive material may be used alone or in combination of two or more. When the negative electrode active material is sufficiently conductive, a configuration in which negative electrode composite material layer 22 does not include the conductive material is also conceivable. The binder should not be particularly limited, either. Examples of the binder include carboxymethylcellulose (CMC), styrene-butadiene rubber (SBR), and PAA. The binder may be used alone or in combination of two or more.

Negative electrode 20 may have a spring constant of about 90 to 150 kN/mm (typically, not less than 90 kN/mm and less than 105 kN/mm), for example. The spring constant of negative electrode 20 may be adjusted by the material of negative electrode collector foil 21, the thickness of negative electrode collector foil 21, the composition of negative electrode composite material layer 22, the density of negative electrode composite material layer 22, and the thickness of negative electrode composite material layer 22, for example. Negative electrode composite material layer 22 may have a density of about not less than 0.5 g/cm$^3$ and not more than 1.5 g/cm$^3$ (typically, not less than 0.8 g/cm$^3$ and not more than 1.2 g/cm$^3$), for example.

<<Separator>>

Separator 30 is disposed between positive electrode 10 and negative electrode 20. Separator 30 is electrically insulating. Separator 30 electrically isolates positive electrode 10 and negative electrode 20 from each other. Separator 30 has a thickness of about 5 to 30 μm, for example. Separator 30 has a plurality of pores therein, through which non-aqueous electrolyte solution 102 is allowed to permeate. That is, separator 30 at least partially includes a porous structure. However, the porous structure as used herein may be a structure through which non-aqueous electrolyte solution 102 is allowed to permeate, and may be any structure as long as non-aqueous electrolyte solution 102 is allowed to permeate therethrough.

Separator 30 may include at least one of a porous polyethylene (PE) film and a porous polypropylene (PP) film, for example. Separator 30 may include the porous PE film alone. Separator 30 may have a multilayer structure. Separator 30 may be constructed by stacking a porous PP film, a porous PE film and a porous PP film in this order, for example. Separator 30 may include a heat-resistant layer on its surface. The heat-resistant layer is also porous. The heat-resistant layer includes a heat-resistant material. Examples of the heat-resistant material include alumina, titania, and polyimide.

Separator 30 may have a spring constant of about 90 to 150 kN/mm (typically, not less than 105 kN/mm and not more than 107 kN/mm), for example. The spring constant of separator 30 may be adjusted by the material, thickness, porosity and the like, for example. Separator 30 may have a porosity of about 30 to 80%, for example. The porosity of the separator may be measured by a porosimeter, for example.

<<Low Spring Constant Film>>

Low spring constant film 40 is a film having the lowest spring constant of the components of electrode group 103. Low spring constant film 40 is disposed between positive electrode 10 and negative electrode 20. Low spring constant film 40 may be a self-support film or a non-self-support film. The self-support film refers to a film that maintains the shape by itself. The non-self-support film refers to a film that is formed on the surface of a base material and cannot maintain the shape by itself.

Low spring constant film 40 has a plurality of pores therein, through which non-aqueous electrolyte solution 102 is allowed to permeate. That is, low spring constant film 40 at least partially includes a porous structure. However, the porous structure as used herein may be a structure through which non-aqueous electrolyte solution 102 is allowed to permeate, and may be any structure as long as non-aqueous electrolyte solution 102 is allowed to permeate therethrough.

It is desirable that low spring constant film 40 be electrically insulating. This is because low spring constant film 40 is disposed between positive electrode 10 and negative electrode 20 that should be electrically isolated from each other. However, in a configuration where positive electrode 10 and negative electrode 20 are electrically isolated from each other by separator 30, low spring constant film 40 may be conductive.

In the configuration where positive electrode 10 and negative electrode 20 are electrically isolated from each other by separator 30, it is desirable that low spring constant film 40 have a higher porosity than that of separator 30. This is because lithium ions are then more likely to permeate through low spring constant film 40, and the rate characteristics are thus expected to be improved. However, low spring constant film 40 may have a lower porosity than that of separator 30.

It is desirable that low spring constant film 40 be elastically deformed in response to compression force generated by the expansion of positive electrode 10 and negative electrode 20. That is, it is desirable that low spring constant film 40 include an elastic body. The elastic body readily follows the expansion/contraction of positive electrode 10 and negative electrode 20. For example, low spring constant film 40 may include at least one of a porous fluoroelastomer film and a porous styrene-butadiene rubber film. The porous fluoroelastomer film and the porous SBR film may exhibit rubber elasticity.

The porous fluoroelastomer film and the porous SBR film may have a spring constant suitable for the present embodiment. The porous fluoroelastomer film and the porous SBR film are resistant to a non-aqueous electrolyte solution. Low spring constant film 40 may include the porous fluoroelastomer film or the porous SBR film alone. Low spring constant film 40 may include both the porous fluoroelastomer film and the porous SBR film. For example, low spring constant film 40 may be constructed by stacking the porous fluoroelastomer film and the porous SBR film.

Examples of the fluoroelastomer include vinylidene fluoride-based fluoroelastomer (FKM), tetrafluoroethylene/propylene rubber (FEPM), and tetrafluoroethylene/perfluoro (methyl vinyl ether) rubber (FFKM). Examples of the FKM include vinylidene fluoride/hexafluoropropylene copolymer (binary FKM), and vinylidene fluoride/hexafluoropropylene/tetrafluoroethylene copolymer (ternary FKM).

Low spring constant film 40 may have a thickness of not less than 2 μm and not more than 5 μm, for example. When low spring constant film 40 has a thickness of less than 2 μm, the improved effect of the high-rate cycling characteristics may be reduced. The upper limit of the thickness of low spring constant film 40 should not be particularly limited. However, the volume-capacity density of battery 100 may be reduced as the thickness of low spring constant film 40 increases. The upper limit of the thickness of low spring constant film 40 may be 5 μm, for example.

The thickness of low spring constant film 40 may be measured by a micrometer (manufactured by Mitsutoyo Corporation, for example). The measurement is carried out at least five times. An average value of results of the at least five measurements is employed as the thickness of low spring constant film 40.

Low spring constant film 40 is preferably disposed on the surface of at least one of positive electrode 10 and negative electrode 20. Since low spring constant film 40 is disposed adjacent to positive electrode 10 and negative electrode 20, the expansion of positive electrode 10 and negative electrode 20 is presumably more likely to be absorbed by low spring constant film 40. Low spring constant film 40 may be disposed on the surface of one of positive electrode 10 and negative electrode 20, or on the surfaces of both positive electrode 10 and negative electrode 20.

A method of disposing low spring constant film 40 on the surfaces of positive electrode 10 and negative electrode 20 should not be particularly limited. Low spring constant film 40 may be disposed on the surfaces of positive electrode 10 and negative electrode 20 through spray application, for example. The spray application is a process of spraying a coating material in the form of a mist to the surface of a base material to thereby form a coating film on the surface of the base material. A film including a porous structure may be formed through the spray application.

The spring constant of low spring constant film 40 may be adjusted by the material, thickness, density and the like. The density of low spring constant film 40 may be adjusted by a solid content ratio of the coating material during the spray application, for example. The solid content ratio represents a ratio of the mass of the components other than the solvent in the coating material. The solvent may be an aqueous solvent or an organic solvent.

<<Non-Aqueous Electrolyte Solution>>

Positive electrode 10, negative electrode 20, separator 30 and low spring constant film 40 are impregnated with non-aqueous electrolyte solution 102. Non-aqueous electrolyte solution 102 includes an aprotic solvent and a supporting electrolyte salt. The supporting electrolyte salt is dispersed and dissolved in the aprotic solvent.

The aprotic solvent includes a cyclic carbonate and a chain carbonate, for example. The mixture ratio of the cyclic carbonate and the chain carbonate may be about "cyclic carbonate:chain carbonate=1:9 to 5:5 (v:v)," for example. The (v:v) represents a volume ratio.

Examples of the cyclic carbonate include ethylene carbonate (EC), propylene carbonate (PC), butylene carbonate (BC), vinylene carbonate (VC), and fluoroethylene carbonate (FEC). The cyclic carbonate may be used alone or in combination of two or more. Examples of the chain carbonate include dimethyl carbonate (DMC), ethyl methyl carbonate (EMC), and diethyl carbonate (DEC). The chain carbonate may be used alone or in combination of two or more.

The aprotic solvent may include lactone, cyclic ether, chain ether and carboxylate ester, for example. Examples of the lactone include γ-butyrolactone (GBL) and δ-valerolactone. Examples of the cyclic ether include tetrahydrofuran (THF), 1,3-dioxolane, and 1,4-dioxane. Examples of the chain ether include 1,2-dimethoxyethane (DME). Examples of the carboxylate ester include methyl formate (MF), methyl acetate (MA), and methyl propionate (MP).

The supporting electrolyte salt is a lithium salt. In the aprotic solvent, the lithium salt is dissociated into lithium ions and counter anions. Examples of the lithium salt include $LiPF_6$, $LiBF_4$, $Li[N(FSO_2)_2]$, $Li[N(CF_3SO_2)_2]$, $Li[B(C_2O_4)_2]$ (commonly referred to as "LiBOB"), and $LiPO_2F_2$. The lithium salt may be used alone or in combination of two or more. In non-aqueous electrolyte solution 102, the supporting electrolyte salt may have a concentration of about 0.5 to 2.0 mol/l, for example.

In addition to the aprotic solvent and the supporting electrolyte salt, other components may be added to non-aqueous electrolyte solution 102. An additive amount may be about 1 to 5 mass %, for example. Examples of the other components include cyclohexylbenzene (CHB), biphenyl (BP), ethylene sulfite (ES), and propanesultone (PS).

<<Application of Non-Aqueous Electrolyte Secondary Battery>>

As described above, the non-aqueous electrolyte secondary battery of the present embodiment, in which variation in the salt concentration is less likely to occur, is excellent in high-rate cycling characteristics. Thus, the non-aqueous electrolyte secondary battery of the present embodiment is particularly suitable for applications where high-rate cycling is required. Examples of the applications where high-rate cycling is required include an electric power supply for motive power in a hybrid vehicle (HV), a plug-in hybrid vehicle (PHV), and an electric vehicle (EV). However, the applications of the non-aqueous electrolyte secondary battery of the present embodiment are not limited to such an in-vehicle application. The non-aqueous electrolyte secondary battery of the present embodiment is applicable to any applications.

EXAMPLES

Hereinafter, Examples will be described. The examples below, however, do not limit the scope of claims.

<Manufacturing of Non-Aqueous Electrolyte Secondary Battery>

Non-aqueous electrolyte secondary batteries according to Examples and Comparative Examples were manufactured as follows.

Example 1

1. Manufacturing of Positive Electrode

The following materials were prepared:
Positive electrode active material: $LiNi_{1/3}Co_{1/3}Mn_{1/3}O_2$ (average particle size of 5 μm)
Conductive material: acetylene black (AB)
Binder: PVdF
Solvent: N-methyl-2-pyrrolidone (NMP)
Positive electrode collector foil: Al foil (thickness of 15 μm)

In the description below, $LiNi_{1/3}Co_{1/3}Mn_{1/3}O_2$ will be simply referred to as "NCM."

A positive electrode paste was prepared by mixing together the NCM, the AB, the PVdF and the NMP. The positive electrode paste was applied to the surface (both surfaces) of positive electrode collector foil 11 and then dried, thereby forming positive electrode composite material layer 12. Positive electrode composite material layer 12 was formed to include 92 mass % of the NCM, 5 mass % of the AB and 3 mass % of the PVdF. Positive electrode 10 was thus manufactured. Positive electrode 10 was rolled and cut. Strip-like positive electrode 10 was thus manufactured. In strip-like positive electrode 10, positive electrode composite material layer 12 had a width of 100 mm. The spring constant of positive electrode 10 was measured with the above-described method. The result is shown in Table 1 below.

2. Manufacturing of Negative Electrode

The following materials were prepared:
Negative electrode active material: graphite (average particle size of 10 μm)
Binder: CMC and SBR
Solvent: water
Negative electrode collector foil: Cu foil (thickness of 10 μm)

A negative electrode paste was prepared by mixing together the graphite, the CMC, the SBR and the water. The negative electrode paste was applied to the surface (both surfaces) of negative electrode collector foil 21 and then dried, thereby forming negative electrode composite material layer 22. Negative electrode composite material layer 22 was formed to include 99 mass % of the graphite, 0.5 mass % of the CMC and 0.5 mass % of the SBR. Negative electrode 20 was thus manufactured. Negative electrode 20 was rolled and cut. Strip-like negative electrode 20 was thus manufactured. In strip-like negative electrode 20, negative electrode composite material layer 22 had a width of 105 mm. The spring constant of negative electrode 20 was measured with the above-described method. The result is shown in Table 1 below.

3. Disposition of Low Spring Constant Film

A fluoroelastomer coating material (product name "DAI-EL Latex," manufactured by Daikin Industries, Ltd.) having a solid content ratio of 54 mass % was prepared. The fluoroelastomer coating material included a fluoroelastomer and a solvent. A curtain spray applicator was prepared. The curtain spray applicator was used to apply the fluoroelastomer coating material to the surface (both surfaces) of negative electrode 20. The coating material was dried at 120° C. Low spring constant film 40 was thus disposed on the surface of negative electrode 20. This low spring constant film 40 included a porous fluoroelastomer film. Low spring constant film 40 had a thickness of 5 μm. The spring constant of low spring constant film 40 was measured with the above-described method. The result is shown in Table 1 below.

4. Assembly

Separator 30 having a thickness of 20 μm was prepared. Separator 30 was constructed by stacking a porous PP film, a porous PE film and a porous PP film in this order. That is, separator 30 included a porous PP film and a porous PE film. The spring constant of separator 30 was measured. The result is shown in Table 1 below.

Negative electrode 20 having low spring constant film 40 disposed on its surface and positive electrode 10 were stacked with separator 30 interposed therebetween, and then wound into a flat shape. Electrode group 103 was thus constructed. That is, in electrode group 103, positive electrode 10 and negative electrode 20 were stacked with separator 30 and low spring constant film 40 interposed therebetween. Case 101 having a prismatic shape was prepared. Collector terminal 104 was attached to electrode group 103. Electrode group 103 was housed in case 101.

Non-aqueous electrolyte solution 102 including the following supporting electrolyte salt and aprotic solvent was prepared:

Supporting electrolyte salt: 1 mol/l $LiPF_6$
Aprotic solvent: [EC:DMC:EMC=3:3:4 (v:v:v)]
The (v:v:v) represents a volume ratio.

A prescribed amount of non-aqueous electrolyte solution 102 was injected through the liquid inlet provided in case 101. The liquid inlet was sealed with a sealing plug. Positive electrode 10, negative electrode 20, separator 30 and low spring constant film 40 were impregnated with non-aqueous electrolyte solution 102.

Battery 100 according to Example 1 was thereby manufactured. This battery 100 was a prismatic lithium ion secondary batter having a rated capacity of 5 Ah. This battery 100 was configured such that case 101 applies compression force to electrode group 103 in the stacking direction of positive electrode 10 and negative electrode 20.

Example 2

A fluoroelastomer coating material having a solid content ratio of 50 mass % was prepared. Battery 100 was manufactured in the same procedure as that in Example 1 except that low spring constant film 40 having a thickness of 5 μm was disposed on the surface of negative electrode 20 by this fluoroelastomer coating material.

Example 3

A fluoroelastomer coating material having a solid content ratio of 45 mass % was prepared. Battery 100 was manufactured in the same procedure as that in Example 1 except that low spring constant film 40 having a thickness of 5 μm was disposed on the surface of negative electrode 20 by this fluoroelastomer coating material.

Example 4

A fluoroelastomer coating material having a solid content ratio of 40 mass % was prepared. Battery 100 was manufactured in the same procedure as that in Example 1 except that low spring constant film 40 having a thickness of 5 μm was disposed on the surface of negative electrode 20 by this fluoroelastomer coating material.

Example 5

Battery 100 was manufactured in the same procedure as that in Example 2 except that low spring constant film 40 having a thickness of 2 μm was disposed on the surface of negative electrode 20.

Example 6

An SBR coating material (product name "TRD104A," manufactured by JSR Corporation) having a solid content ratio of 45 mass % was manufactured. Battery 100 was manufactured in the same procedure as that in Example 3 except that low spring constant film 40 having a thickness of 5 μm was disposed on the surface of negative electrode 20 by this SBR coating material. This low spring constant film 40 included a porous SBR film.

Example 7

Battery 100 was manufactured in the same procedure as that in Example 2 except that low spring constant film 40 was disposed on the surface of positive electrode 10.

Comparative Example 1

Battery 100 was manufactured in the same procedure as that in Example 1 except that low spring constant film 40 was not disposed on the surface of negative electrode 20.

Comparative Example 2

Battery 100 was manufactured in the same procedure as that in Comparative Example 1 except that separator 30 having a thickness of 25 μm was used.

Comparative Example 3

Negative electrode 20 that had not been rolled was prepared. Low spring constant film 40 was disposed on the surface of this negative electrode 20 in the same procedure as that in Example 1. Negative electrode 20 having low spring constant film 40 disposed thereon was rolled. Battery 100 was manufactured in otherwise the same procedure as that in Example 1.

TABLE 1

List of Examples and Comparative Examples

| | Positive Electrode Spring Constant [kN/mm] | Negative Electrode Spring Constant [kN/mm] | Separator Spring Constant [kN/mm] | Separator Thickness [μm] | First Spring Constant (A) [kN/mm] | Low Spring Constant Film Disposition | Low Spring Constant Film Material | Second Spring Constant (B) [kN/mm] | Second Spring Thickness [μm] | Spring Constant Ratio (B/A) [-] | High-Rate Cycling IV Resistance Increase Ratio [%] |
|---|---|---|---|---|---|---|---|---|---|---|---|
| Comparative Example 1 | 150 | 90 | 105 | 20 | 90 | — | — | — | — | — | 100 |
| Comparative Example 2 | 150 | 90 | 107 | 25 | 90 | — | — | — | — | — | 110 |
| Comparative Example 3 | 150 | 90 | 105 | 20 | 90 | Negative Electrode Surface | Porous Fluoroelastomer Film | 92 | 5 | 1.02 | 105 |
| Example 1 | 150 | 90 | 105 | 20 | 90 | Negative Electrode Surface | Porous Fluoroelastomer Film | 81 | 5 | 0.90 | 78 |
| Example 2 | 150 | 90 | 105 | 20 | 90 | Negative Electrode Surface | Porous Fluoroelastomer Film | 70 | 5 | 0.78 | 62 |
| Example 3 | 150 | 90 | 105 | 20 | 90 | Negative Electrode Surface | Porous Fluoroelastomer Film | 63 | 5 | 0.70 | 56 |
| Example 4 | 150 | 90 | 105 | 20 | 90 | Negative Electrode Surface | Porous Fluoroelastomer Film | 54 | 5 | 0.60 | 52 |
| Example 5 | 150 | 90 | 105 | 20 | 90 | Negative Electrode Surface | Porous Fluoroelastomer Film | 70 | 2 | 0.78 | 78 |
| Example 6 | 150 | 90 | 105 | 20 | 90 | Negative Electrode Surface | Porous SBR Film | 65 | 5 | 0.72 | 64 |
| Example 7 | 150 | 90 | 105 | 20 | 90 | Positive Electrode Surface | Porous Fluoroelastomer Film | 70 | 5 | 0.78 | 62 |

<Evaluation>

Each of the batteries was evaluated in high-rate cycling tests.

The SOC (State of Charge) of the battery was adjusted to 60%. A battery voltage before discharging ($V_0$) was measured. The battery was discharged for 10 seconds at a current (I) of 100 A in a 25° C. environment. A battery voltage after the discharging for 10 seconds ($V_{10}$) was measured. Initial IV resistance was calculated in accordance with a formula of "(IV resistance)=$(V_0-V_{10})\div I$."

The following cycle of "high-rate charging→rest→discharging→rest" was defined as one cycle, and the one cycle was repeated 2000 times:

High-rate charging: 150 A×10 seconds
Rest: 10 seconds
Discharging: 5 A×300 seconds
Rest: 10 seconds Subsequently, post-cycling IV resistance was measured with the same method as that for the initial IV resistance. By dividing the post-cycling IV resistance by the initial IV resistance, an IV resistance increase ratio was calculated. The results are shown in Table 1 above. It is indicated that as the IV resistance increase ratio is lower, the high-rate cycling characteristics are more excellent.

<Results>

As shown in Table 1 above, the high-rate cycling characteristics are more excellent in the Examples satisfying the condition that the second spring constant is lower than the first spring constant as compared with the Comparative Example not satisfying the condition. Since non-aqueous electrolyte solution 102 having an average salt concentration is preferentially pushed out of low spring constant film 40, variation in the salt concentration is presumably less likely to occur.

Comparative Example 1 is inferior in high-rate cycling characteristics. Comparative Example 1 does not include low spring constant film 40. Thus, non-aqueous electrolyte solution 102 having a low salt concentration is pushed out of negative electrode 20 having the lowest spring constant of the components of electrode group 203. This presumably causes variation in the salt concentration.

Comparative Example 2 includes separator 30 having a thickness of 25 μm. The thickness of 25 μm is equal to the sum of the thicknesses of separator 30 and low spring constant film 40 in the Examples. However, Comparative Example 2 is inferior in high-rate cycling characteristics to Comparative Example 1. This is presumably because the increased thickness of separator 30 increases the resistance of non-aqueous electrolyte solution 102 in separator 30.

Comparative Example 3 is inferior in high-rate cycling characteristics despite including low spring constant film 40. In Comparative Example 3, the spring constant of low spring constant film 40 (second spring constant) is greater than the spring constant of negative electrode 20 (first spring constant). Thus, non-aqueous electrolyte solution 102 having a low salt concentration is preferentially pushed out of negative electrode 20. This presumably causes variation in the salt concentration.

In Examples 1 to 7, the spring constant ratio (second spring constant/first spring constant) is not more than 0.90.

Thus, the spring constant ratio is preferably not more than 0.90. From the results of Examples 1 to 4, it is observed that the high-rate cycling characteristics tend to be improved as the spring constant ratio is reduced. That is, the spring constant ratio is more preferably not more than 0.78, and further more preferably not more than 0.70.

However, the magnitude of improvement in high-rate cycling characteristics is small when the spring constant ratio falls below 0.70. For this reason, the high-rate cycling characteristics may not be improved significantly any more when the spring constant ratio falls below 0.60. Accordingly, the spring constant ratio is preferably not less than 0.60.

In Examples 1 to 7, low spring constant film 40 has a thickness of not more than 5 µm. The improved effect of the high-rate cycling characteristics is smaller in Example 5 than in Example 2. It is considered that the improved effect of the high-rate cycling characteristics is reduced as the thickness of low spring constant film 40 decreases. Accordingly, low spring constant film 40 preferably has a thickness of not less than 2 µm and not more than 5 µm.

The same effect as in Example 3 (porous fluoroelastomer film) is also observed in Example 6 (porous SBR film). It is considered that the same effect as that in the case where low spring constant film 40 includes one of the porous fluoroelastomer film and the porous SBR film is also expected in the case where low spring constant film 40 includes both the porous fluoroelastomer film and the porous SBR film. Accordingly, it is considered that low spring constant film 40 may include at least one of the porous fluoroelastomer film and the porous SBR film.

The same effect as in Example 2 where low spring constant film 40 is disposed on the surface of negative electrode 20 is also observed in Example 7 where low spring constant film 40 is disposed on the surface of positive electrode 10. It is thus considered that low spring constant film 40 may be disposed between positive electrode 10 and negative electrode 20. It is considered that the same effect as that in the case where low spring constant film 40 is disposed on the surface of one of positive electrode 10 or negative electrode 20 is also expected in the case where low spring constant film 40 is disposed on the surfaces of both positive electrode 10 and negative electrode 20. That is, it is considered that low spring constant film 40 is preferably disposed on the surface of at least one of positive electrode 10 and negative electrode 20.

Although the embodiments have been described, it should be understood that the embodiments disclosed herein are illustrative and non-restrictive in every respect. The technical scope defined by the claims is intended to include any modifications within the scope and meaning equivalent to the terms of the claims.

What is claimed is:

1. A non-aqueous electrolyte secondary battery comprising:
   a case;
   a non-aqueous electrolyte solution; and
   an electrode group,
   the non-aqueous electrolyte solution and the electrode group being housed in the case,
   the non-aqueous electrolyte solution including an aprotic solvent and a supporting electrolyte salt,
   the electrode group including a positive electrode, a negative electrode, a separator and a low spring constant film,
   each of the positive electrode, the negative electrode, the separator and the low spring constant film at least partially including a porous structure,
   the positive electrode, the negative electrode, the separator and the low spring constant film being impregnated with the non-aqueous electrolyte solution,
   in the electrode group, the positive electrode and the negative electrode being stacked so as to face each other with the separator and the low spring constant film interposed therebetween,
   the positive electrode or the negative electrode having a first spring constant that is the lowest spring constant of the positive electrode, the negative electrode and the separator,
   the low spring constant film having a second spring constant, and
   the second spring constant being lower than the first spring constant.

2. The non-aqueous electrolyte secondary battery according to claim 1, wherein
   a ratio of the second spring constant to the first spring constant is not less than 0.60 and not more than 0.90.

3. The non-aqueous electrolyte secondary battery according to claim 1, wherein
   the low spring constant film is disposed on a surface of at least one of the positive electrode and the negative electrode.

4. The non-aqueous electrolyte secondary battery according to claim 1, wherein
   the low spring constant film includes at least one of a porous fluoroelastomer film and a porous styrene-butadiene rubber film.

5. The non-aqueous electrolyte secondary battery according to claim 1, wherein
   the low spring constant film has a thickness of not less than 2 µm and not more than 5 µm.

6. The non-aqueous electrolyte secondary battery according to claim 1, wherein
   the non-aqueous electrolyte secondary battery is configured such that the case applies compression force to the electrode group in a direction in which the positive electrode and the negative electrode are stacked.

* * * * *